United States Patent [19]

LaCroix

[11] 4,357,649
[45] Nov. 2, 1982

[54] SHOCK MOUNTING FOR LASER

[76] Inventor: Eugene F. LaCroix, 5611-240th SE., Woodinville, Wash. 98072

[21] Appl. No.: 170,936

[22] Filed: Jul. 21, 1980

[51] Int. Cl.³ .............................. F21S 3/00; H01S 3/03
[52] U.S. Cl. .................................... 362/217; 362/259; 362/290; 372/109
[58] Field of Search ................... 331/94.5 D; 362/217, 362/259, 390

[56] References Cited

U.S. PATENT DOCUMENTS

| | | | |
|---|---|---|---|
| 3,357,268 | 12/1967 | Richter | 331/94.5 D |
| 3,361,989 | 1/1968 | Sirons | 331/94.5 D |
| 3,400,596 | 9/1968 | Laich | 331/94.5 D |
| 3,440,563 | 4/1969 | Clement | 331/94.5 D |
| 3,521,190 | 7/1970 | Schimitschek et al. | 331/94.5 D |
| 3,537,030 | 10/1970 | Dorbec et al. | 331/94.5 D |
| 3,617,926 | 10/1971 | Bullinger | 331/94.5 D |
| 3,628,175 | 12/1971 | Ridgen | 331/94.5 D |
| 3,670,263 | 6/1972 | Kantorski et al. | 331/94.5 D |
| 3,751,139 | 8/1973 | Malherbe | 331/94.5 D |
| 3,847,703 | 10/1974 | Kaiser | 331/94.5 D |
| 4,030,046 | 6/1977 | Firester | 331/94.5 D |
| 4,050,037 | 9/1977 | Knowles et al. | 331/94.5 D |
| 4,220,933 | 9/1980 | Kuhn, Jr. | 331/94.5 D |

*Primary Examiner*—S. A. Cangialosi
*Attorney, Agent, or Firm*—Cole, Jensen & Puntigam

[57] ABSTRACT

A mounting for use in conjunction with a laser in an installation where the structure may be subjected to destructive shock. The structure includes an external rigid shell to contain the laser head and power supply panel. The shell encloses impact absorbing shock mounts or plates which serve to retain shock reduction cushions which surround the laser head and support it within the shell returning it to its appropriate position following shock. A shock absorbing bracket is provided to mount the entire unit in position.

7 Claims, 6 Drawing Figures

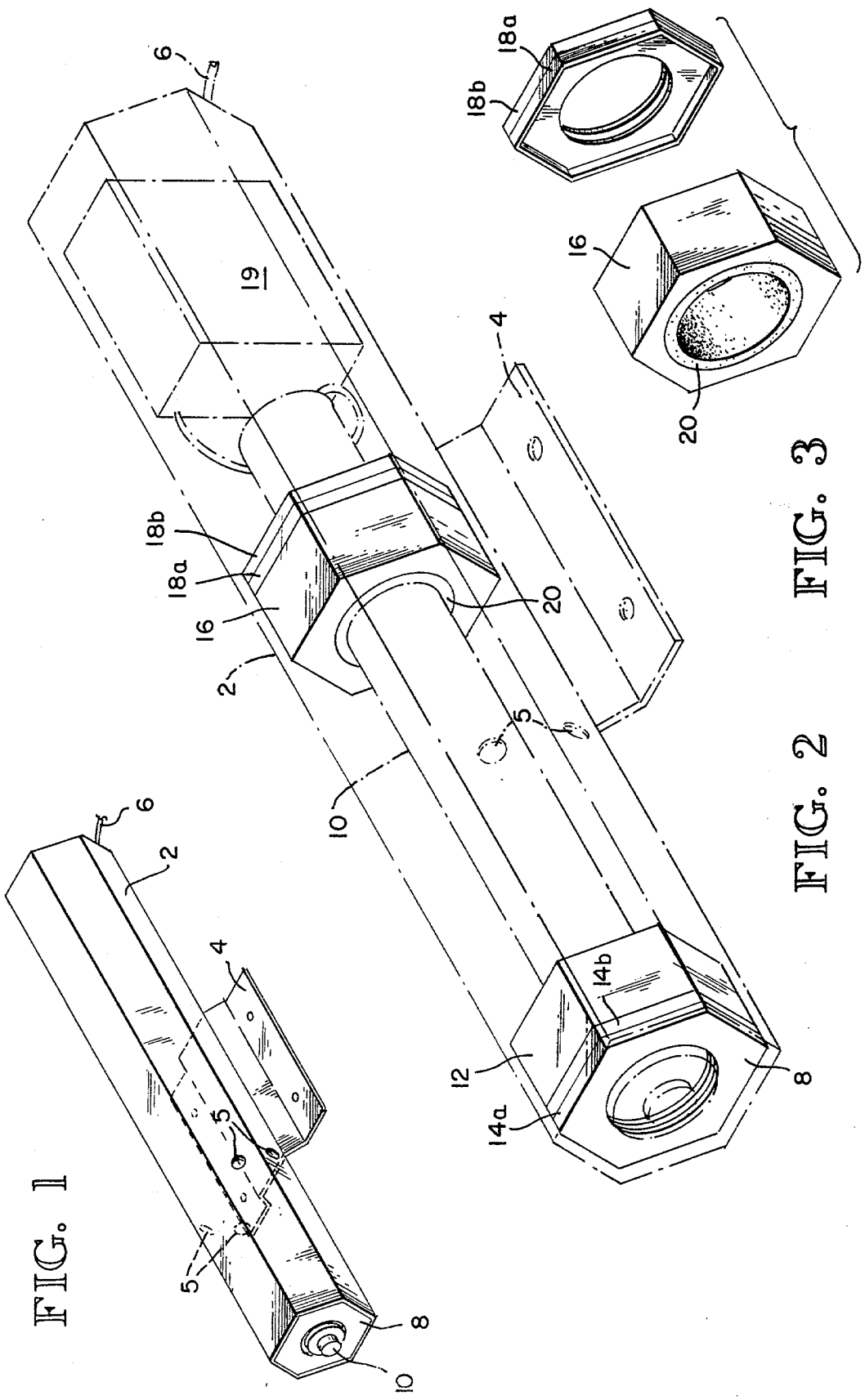

SHOCK MOUNTING FOR LASER

BACKGROUND OF THE INVENTION

The discovery of lasers and the technology which has made them practical instrumentations has lead to a myriad of practical applications. One of the many areas where lasers are used in industry is in the lumber making or saw mill operations. The utilization of known optics permits the beam to be transmitted as a thin line which can be used to guide the saws in an automated or semi-automated operation.

As is readily apparent, the utilization of a high quality and expensive device such as a laser in an installation within the saw mill presents inherent hazards because of the abusive environment.

In an effort to protect the laser from damage, prior installations have utilized protective outer shells within which the laser itself is mounted. Normally these outer shells include a rigid but fragile interconnection to support the laser head such that if the shell is subjected to shock such as being stricken by a piece of lumber or the like, the interconnection will be destroyed thus protecting the laser head itself. The disadvantage of this type of an installation lies in the fact that following the shock, the laser must be remounted within the shell and the entire unit realigned to assure accuracy.

In addition, some manufacturers, in order to maintain the relationship of laser beam to optics, mount both apparatus rigidly. They have achieved solid alignment, however, they have sacrificed whatever shock protection they could have had. Thus, all shock waves felt or received by the case are equally dispersed through the laser (glass) tube.

Due to the nature of the laser as being light, it also has all the properties of light. Hence, it cannot pass through opaque materials; therefore, the light emitting end of the laser must protrude through the case. It is this characteristic that causes the laser to be rigidly mounted through one portion of the case. Some manufacturers choose internal mounting with a window and others mount the laser through the case. Either way the mounting is rigid because of design in alignment or because of no alternative in dealing with the properties of light.

Breakage is extremely high in either of the above cases. In the forest industry, these are the only two ways presently known to the inventor, the laser tube is mounted.

Patents known to the present inventor dealing with the particular problem of mounting a protecting shell for a laser include the following:

U.S. Pat. No. 3,357,268—Richter
U.S. Pat. No. 3,537,030—Dorbec et al.
U.S. Pat. No. 3,361,989—Sirons
U.S. Pat. No. 3,617,923—Bullinger
U.S. Pat. No. 3,400,596—Lasich
U.S. Pat. No. 3,628,175—Rigdon
U.S. Pat. No. 3,440,563—Clement
U.S. Pat. No. 3,670,263—Kantorski et al.
U.S. Pat. No. 3,521,190—Schimitschek et al.
U.S. Pat. No. 4,050,037—Knowles et al.

The Schimitschek patent discloses a laser cell which is mounted within a housing which appears to be formed by two engaged shell members.

The Clement patent discloses a laser casing which is formed by a base member for a housing and an upper cover unit. This structure is in combination with a laser mounting unit providing a kinetic mounting structure for the laser.

The Dorbec patent discloses a laser device mounted within a housing formed by two half shells. A square teflon nut sits around the middle of the laser to support the tube in the housing in cooperation with adjustment screws and a return spring cylinder.

The remaining listed patents disclose other laser housings and mounting devices for lasers.

With the above noted prior art and difficulties in mind, it is an object of the present invention to provide a protective support and container for a laser utilized in industrial environments.

It is another object to provide a shock absorbing housing for a laser wherein the shock absorbing means also provides an isolating insulative means.

It is a further object of the present invention to provide a mounting system for a laser or other instrument wherein precise alignment is required and which will absorb shock without damage to the instrument.

Still a further object of the present invention is to provide a shock absorbing mounting for an instrument specifically constructed to absorb axial shock loads.

Yet another object of the present invention is to provide a mechanism for mounting an instrument subject to shock loads wherein the elements displaced during the shock have memory, returning the instrument to position following the shock.

BRIEF DESCRIPTION OF THE DRAWINGS

FIG. 1 is a pictorial representation of the laser within its shock absorbing housing and secured to a shock absorbing mounting bracket.

FIG. 2 is a view wherein the shell is shown in phantom disclosing the interior including the laser head, the shock absorbing mounts and the power supply chamber.

FIG. 3 is an exploded view disclosing the relationship between the shock cushion and the high impact shock plates.

DETAILED DESCRIPTION OF THE DRAWINGS

Figure 4:
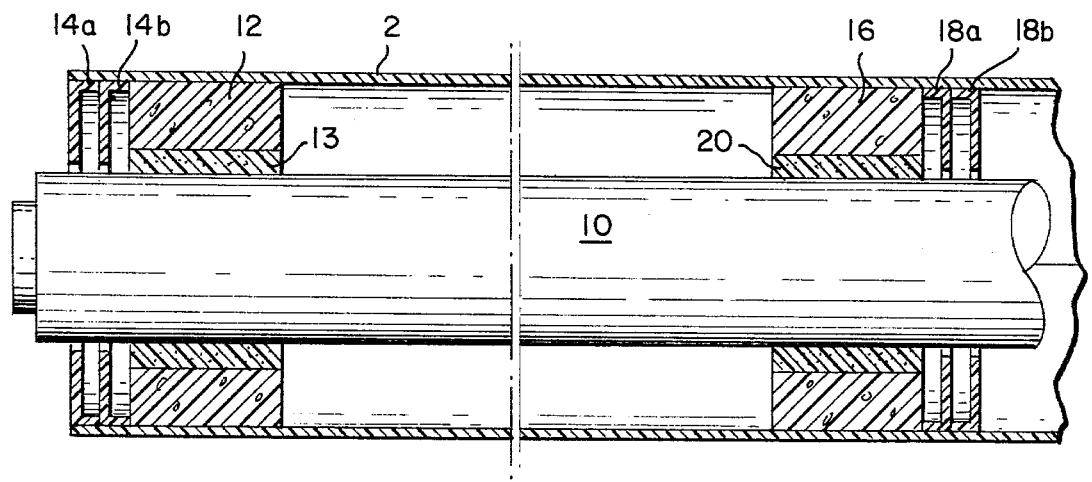
FIG. 4 is a sectional view further disclosing the interrelationship between the high impact plates, the shock cushion and the laser itself.

As seen in FIG. 1, the laser installation as described in detail hereinafter includes a shock absorbing shell 2 of a rigid material which is secured to a shock absorbing mounting bracket 4. The shock absorbing shell 2 as described in greater detail hereinafter includes openings 5 in the general location of the laser head to permit the flow of air by the laser head providing cooling by ambient air and includes an external cord 6 for the supply of power. It is to be understood that openings 5 will include means preventing the influx of dust or the like. The front of the laser includes a high impact shock plate 8 which permits the laser head, designated as 10, which is understood to include optics to control the beam, to extend therethrough.

As seen in FIG. 2, the high impact outer shell 2, which includes the shock absorbing mechanism, has at its forward end a shock mounting plate which is mounted within the shell and adds structural integrity thereto. The shock mounting plate as well as those plates described hereinafter are conformed to fit the interior surface of the shell which in this particular case is octagonal. The fact that the plates and the shell are contiguous and bonded together assure structural integrity and further aid in preventing the entrance of unwanted dust or the like. Further, the shock mounting plates have a central generally circular opening 9 which has an internal diameter slightly greater than the external diameter of the laser head to permit lateral movement generated by shock without contact between the head and the plate. Secured within the shell 2 but located generally behind the plate 8 is a shock reduction cushion 12 which primarily absorbs shock impacted radially of the laser head. Proceeding rearwardly along the laser head it can be seen that a second shock mount which comprises of the shock absorbing cushion 16 and a second shock plate 18 can be seen. It is to be noted in this view and described in greater detail hereinafter that the shock damper cushion 16 surrounds a shock reduction cushion 20 of a different material. It is also to be understood that the cushions 16 and 20 are intimately engaged with each other and the head and therefore do absorb some axial shock. Further to be found within the shell 2 is the power chamber which is thermally isolated from the laser by means of the shock cushion 16, 20 as described in greater detail hereinafter. The thermal isolation and the venting allows the laser head to operate at a lower temperature extending its life and further reduces the thermal shock experienced at the joints.

Referring now to FIG. 3 which depicts a shock mount assembly in an exploded view, it can be seen that the shock cushion which is a combination of elements 16 and 20 includes an innermost cylinder 20, which is of a polyester material designed to protect the laser tube from shock and vibration generated during normal use, and an exterior element which intimately surrounds the interior unit 20 and conforms to the interior of the shell and which is made of a polystyrene which limits the duration of the transitory shock waves created by excessive impactual vibration. The combination of the two differing cushions when acting in conjunction with the shock plate 18, which as seen in this view, comprises two contiguous plates which may be mounted front to back or front to front, provides the best tube protection available to date. As noted above, the combination of these elements in addition to providing the shock absorption necessary also provide a means for isolating the heat generated by the tube which may then be dissipated through the vents 5 but also because of their insulative quality tend to keep the various elements at a constant temperature avoiding thermal shocks thus increasing the life of both the laser tube and the power supply.

Referring now to FIG. 4, a typical structure may be seen in greater detail. It can be seen that the internal polyester 13, 20 intimately surrounds the tube 10 and is then itself surrounded by the polystyrene which is intimately related with the shell 2. The combination of these two elements is secured in appropriate position by an appropriate combination of the shock plates 14a, 14b or as shown as 18.

Figure 5:
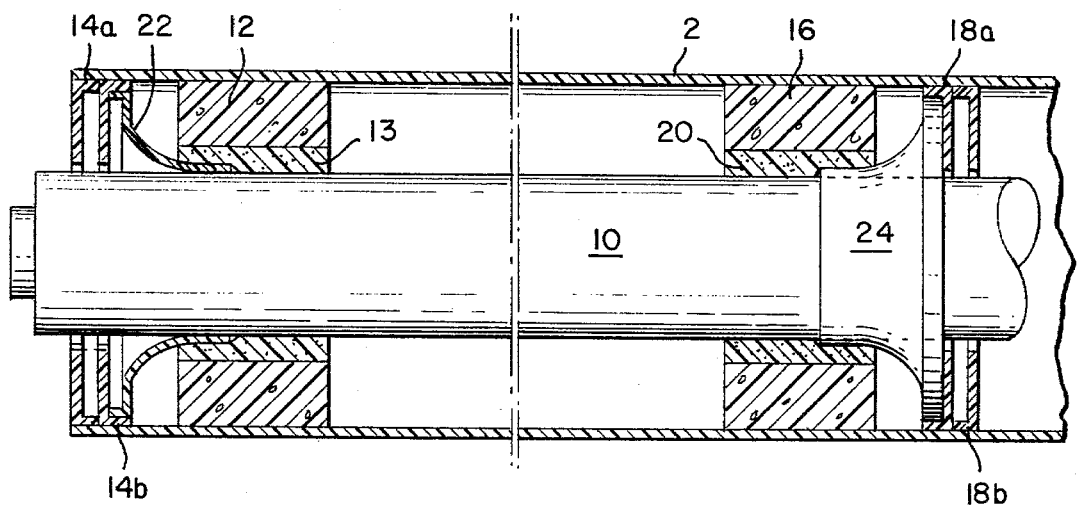
FIG. 5 is another sectional view disclosing additional shock absorbing devices for shocks along the axis of the laser.

Referring now to FIG. 5, a substantially identical cross section is shown with the exception that the shock cushion is displaced slightly from the shock mounts and placed therebetween is a flexible mount 22, 24 which is designed to fit in the high impact plate internal shell and extends longitudinally along the tube 10. Upon the impact of an axial shock load, the skirt which extends along the tube 10 collapses allowing axial movement without damage. The flexible shock mount and its skirt have memory such that once the shock load is released, the mount returns to its initial position returning the tube to its appropriate location.

Figure 6:
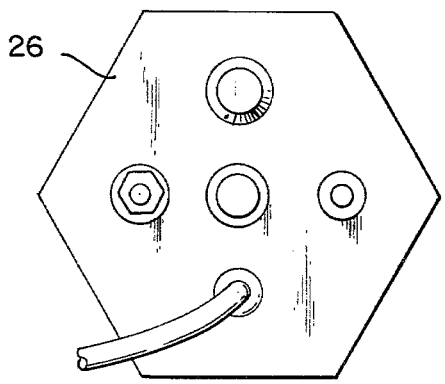
FIG. 6 is a view of the control panel.

As seen in FIG. 6, the control panel 26 includes an indicator lamp fuse holder, vibration proof key lock switch and a remote control jack.

Thus as can be seen, the combination of the various elements which may be used singly or in combination provide a mount for a laser which protects the laser against damage from external shocks up to 300 times the force of gravity (300 G) without damage. It is further to be understood that although the specific structure has been described in conjunction with a laser, appropriate use will include any fragile or sensitive instrument in adverse conditions.

What is claimed is:

1. An omni directional shock absorbing mounting for a laser including a laser head and the power supply comprising:
    an exterior shell of a length greater than that of the laser head and an internal dimension greater than the diameter of the laser head;
    at least two impact absorbing shock plates configured to intimately fit within the shell, reinforcing same, secured to the shell and extending inwardly thereof to terminate in a circular opening having a diameter greater than that of the laser head and surrounding said head, whereby the laser head can move without contacting the shock plates;
    shock reduction cushion means adjacent the shock plate, contiguous with the laser head and the exterior shell whereby a shock delivered to the shell will not be transferred to or significantly change the placement of the head.

2. A mounting as in claim 1 wherein the shock reduction cushioning means comprises two materials having differing shock absorbing characteristics.

3. A mounting as in claim 1, wherein the shock reduction cushioning means has memory.

4. A mounting as in claim 1, wherein the shell is vented to the atmosphere to permit natural cooling.

5. A mounting as in claim 1, wherein the shell is secured to a universal mounting bracket which further absorbs shock.

6. A universal, omnidirectional shock absorbing mount for a fragile instrument or the like comprising:
    a high impact shell surrounding the instrument and spaced therefrom,
    multi-density shock cushion means intimately surrounding the instrument and contiguous with the interior of the shell, and
    shock plate means of a pliable but rigid material having a central opening of a diameter larger than the exterior of the instrument, secured to the shell surrounding the instrument and abutting the shock cushion means whereby shocks will be absorbed by the cushion and the instrument will not contact the plates or the shell.

7. A universal shock absorbing mount as in claim 6 and further including means to specifically absorb axial shock.

* * * * *